(12) United States Patent
Walker et al.

(10) Patent No.: US 10,386,047 B2
(45) Date of Patent: Aug. 20, 2019

(54) FABRIC WITH EMBEDDED ILLUMINATION DEVICE

(71) Applicant: REVELLA, LLC, Maitland, FL (US)

(72) Inventors: Lisa Walker, Maitland, FL (US); Wayne Nassis, Jr., Winter Park, FL (US)

(73) Assignee: REVELLA, INC., Maitland, FL (US)

( * ) Notice: Subject to any disclaimer, the term of this patent is extended or adjusted under 35 U.S.C. 154(b) by 0 days.

(21) Appl. No.: 15/996,757

(22) Filed: Jun. 4, 2018

(65) Prior Publication Data

US 2018/0274767 A1    Sep. 27, 2018

Related U.S. Application Data

(63) Continuation-in-part of application No. 15/927,381, filed on Mar. 21, 2018, which is a continuation of application No. 15/391,468, filed on Dec. 27, 2016, now Pat. No. 10,001,263.

(60) Provisional application No. 62/272,373, filed on Dec. 29, 2015.

(51) Int. Cl.
| | | |
|---|---|---|
| F21V 21/08 | (2006.01) |
| A47K 10/02 | (2006.01) |
| H05B 37/02 | (2006.01) |
| H05B 33/08 | (2006.01) |
| F21V 23/04 | (2006.01) |
| F21V 33/00 | (2006.01) |
| F21V 23/00 | (2015.01) |
| F21L 4/02 | (2006.01) |
| F21Y 115/10 | (2016.01) |

(52) U.S. Cl.
CPC .......... *F21V 21/0816* (2013.01); *A47K 10/02* (2013.01); *F21L 4/02* (2013.01); *F21V 23/002* (2013.01); *F21V 23/0435* (2013.01); *F21V 33/0004* (2013.01); *H05B 33/0854* (2013.01); *H05B 33/0863* (2013.01); *H05B 37/0227* (2013.01); *F21Y 2115/10* (2016.08)

(58) Field of Classification Search
CPC ............. H05B 37/0227; F21V 23/0435; F21V 33/0004; F21V 21/0816; F21V 23/002; A47K 10/02; F21L 4/02; F21Y 2115/10; A61B 5/6831; A41D 1/002; A41D 20/00; A42B 1/24; A42B 1/244
See application file for complete search history.

(56) References Cited

U.S. PATENT DOCUMENTS

| | | |
|---|---|---|
| 4,599,682 A | 7/1986 | Stephens |
| 5,455,749 A | 10/1995 | Ferber |
| 6,733,150 B1 * | 5/2004 | Hanley .................. A42B 1/244 2/209.13 |
| 7,592,276 B2 | 9/2009 | Hill et al. |

(Continued)

*Primary Examiner* — Haissa Philogene
(74) *Attorney, Agent, or Firm* — Beusse, Wolter, Sanks & Maire PLLC; Robert L. Wolter

(57) ABSTRACT

An apparatus is provided that includes a piece of fabric with three sides and a slot formed in one or more sides of the piece of fabric. The apparatus includes one or more lighting devices positioned within the slot. The apparatus also includes a button operatively coupled to the lighting devices such that the lighting devices are configured to illuminate upon depression of the button. A method is also provided for forming the piece of fabric with the three sides.

16 Claims, 12 Drawing Sheets

(56) References Cited

U.S. PATENT DOCUMENTS

| | | | | |
|---|---|---|---|---|
| 8,142,061 B2* | 3/2012 | Jablonski | ............ | A43B 1/0036 |
| | | | | 362/559 |
| 8,388,164 B2* | 3/2013 | Waters | .................. | A42B 1/244 |
| | | | | 174/74 A |
| 9,003,569 B2 | 4/2015 | Ramirez | | |
| 9,320,946 B2 | 4/2016 | Bothwell | | |
| 9,351,900 B2* | 5/2016 | Walsh | .................... | A61H 1/024 |
| 9,521,868 B2* | 12/2016 | Cobbett | ............... | A61B 5/0205 |
| 10,001,263 B2* | 6/2018 | Walker | ............... | F21V 23/0435 |
| 2004/0009729 A1 | 1/2004 | Hill et al. | | |
| 2013/0106289 A1 | 5/2013 | Beneski et al. | | |
| 2018/0209619 A1* | 7/2018 | Walker | ............... | F21V 23/0435 |

\* cited by examiner

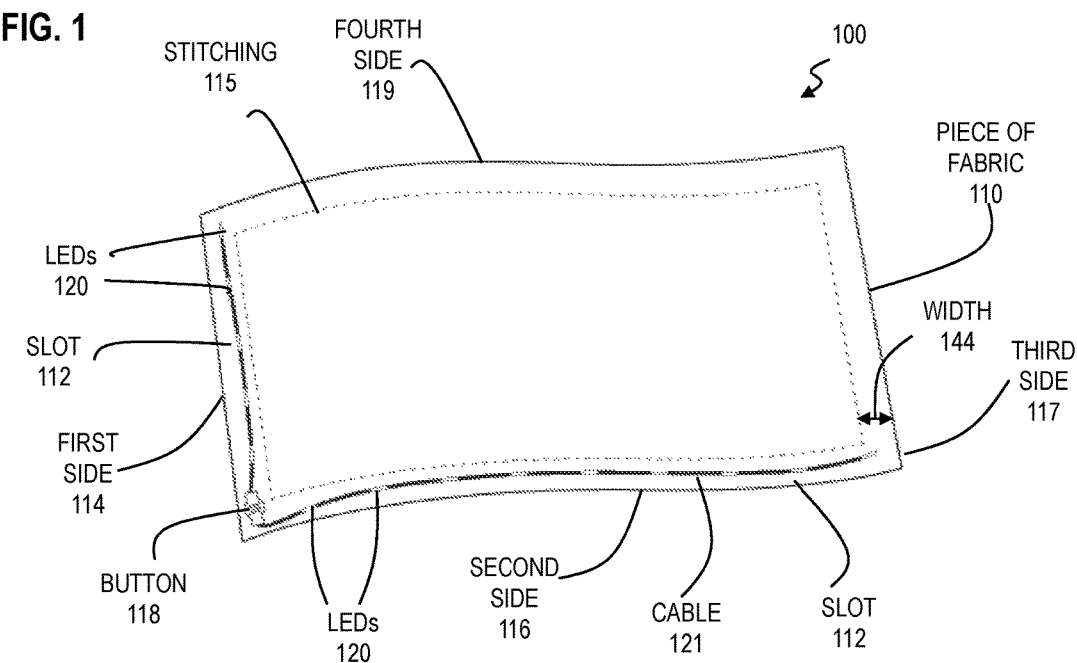

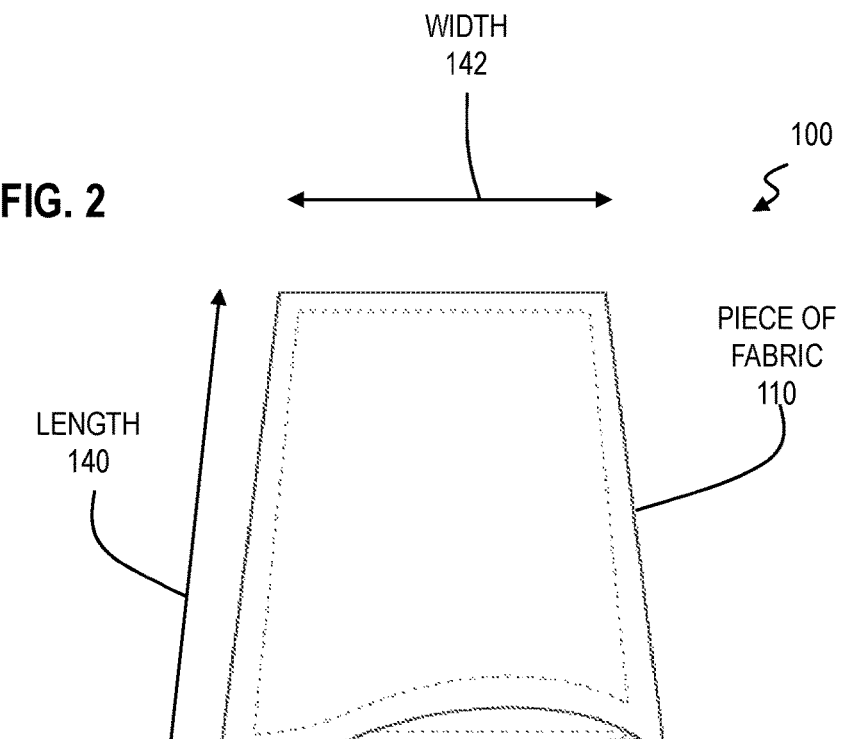
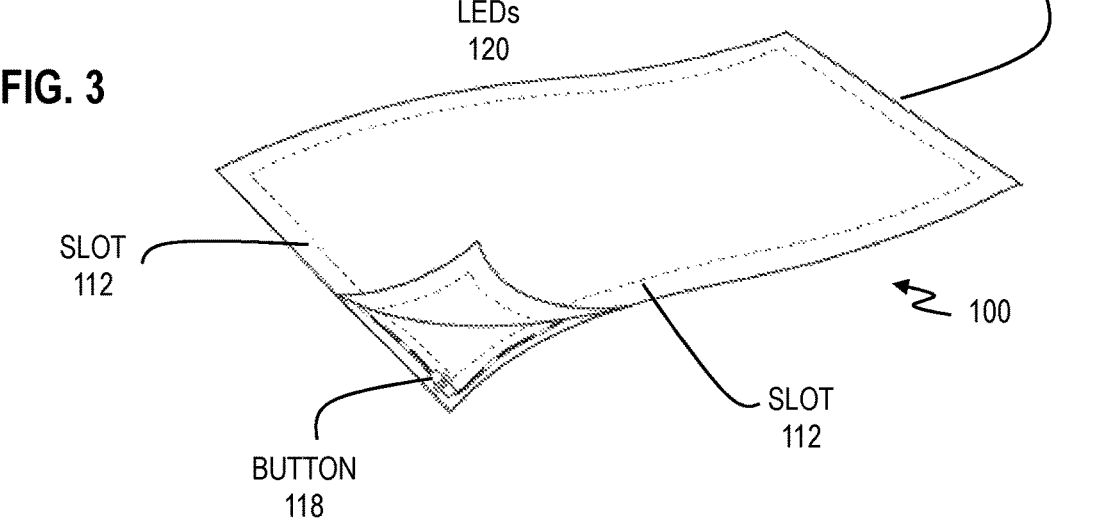

FIG. 4D
FIG. 4C
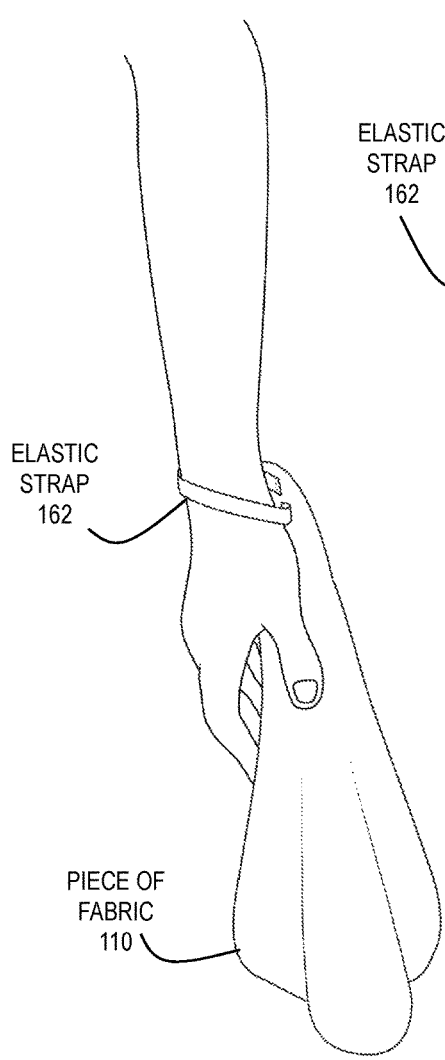
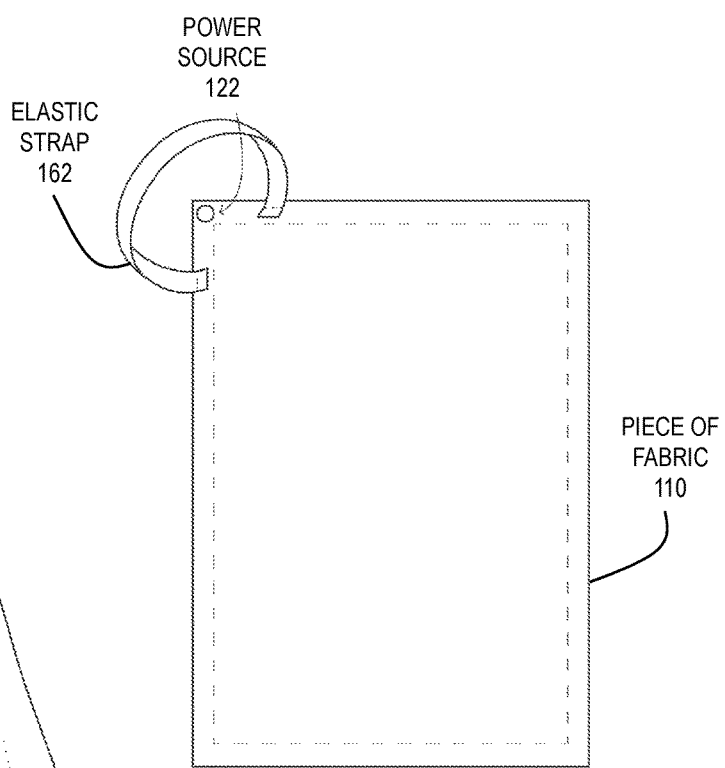

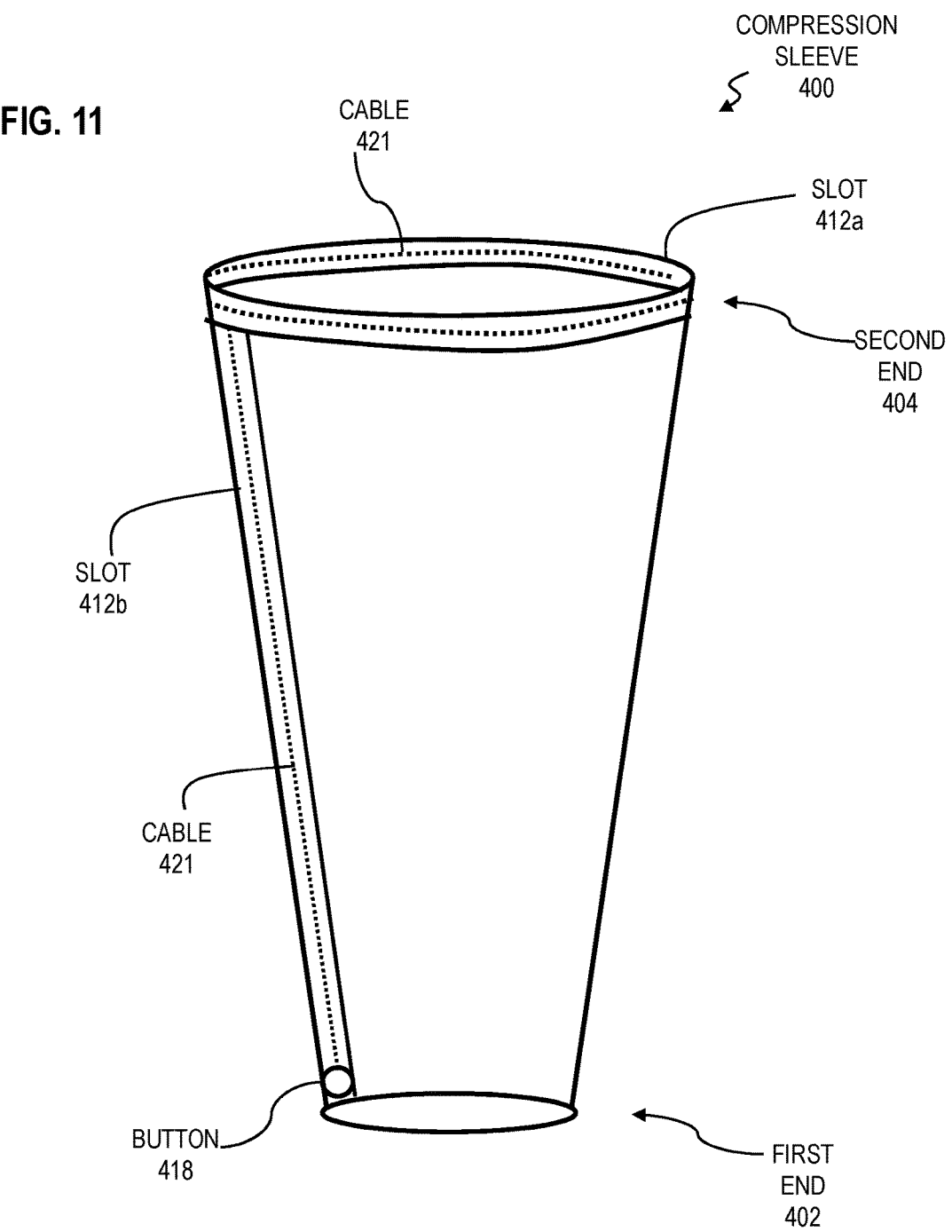

FABRIC WITH EMBEDDED ILLUMINATION DEVICE

CROSS REFERENCE TO RELATED APPLICATIONS

This application is a Continuation-In-Part of U.S. application Ser. No. 15/927,381, filed on Mar. 21, 2018 and U.S. application Ser. No. 15/391,468, filed Dec. 27, 2016, which in turn claims benefit of Provisional Appln. No. 62/272,373, filed Dec. 29, 2015, the entire contents of which are hereby incorporated by reference as if fully set forth herein, under 35 U.S.C. § 119(e).

BACKGROUND OF THE INVENTION

Light Emitting Diodes (LED) are commonly used with fabrics, and have been embedded within fabric, such as a towel, after which the LEDs illuminate the fabric, for decorative and aesthetic purposes. However, there are several drawbacks to conventional fabric designs with embedded LEDs. For example, the placement of the LEDs within conventional fabric is not conducive to a user holding the fabric. In another example, conventional fabric designs with embedded LEDs typically feature a manual switch that merely turns the LEDs on or off in one operational mode, without any further options.

BRIEF DESCRIPTION OF THE INVENTION

One embodiment of the present invention is an apparatus that includes a piece of fabric with three sides and a slot formed in one or more of the three sides of the piece of fabric. The apparatus also includes one or more lighting devices positioned within the slot. The apparatus also includes a button operatively coupled to the lighting devices such that the lighting devices are configured to illuminate upon depression of the button.

Another embodiment of the present invention is an apparatus that includes a piece of fabric with a slot formed in the piece of fabric. The apparatus also includes one or more lighting devices positioned within the slot. The apparatus also includes a button operatively coupled to the one or more lighting devices such that the lighting devices are configured to illuminate upon depression of the button.

Yet another embodiment of the present invention is a method for forming a piece of fabric with an embedded lighting device. The method includes the step of providing a piece of fabric with three sides. The method also includes the step of forming a slot along one or more of the three sides. The method further includes the step of positioning one or more lighting devices within the slot of the piece of fabric.

BRIEF DESCRIPTION OF THE DRAWINGS

FIG. 1 is a top cut-away view of an apparatus including a piece of fabric and LEDs in accordance with aspects of embodiments of the invention.

FIG. 2 is a top cut-away view of the apparatus of FIG. 1.

FIG. 3 is a top cut-away view of the apparatus of FIG. 1.

FIG. 4C is a top cut-away view of an apparatus including a piece of fabric with an elastic strap in accordance with aspects of embodiments of the invention.

FIG. 4D is a perspective view of the piece of fabric of FIG. 4C secured around a wrist of a user in accordance with aspects of embodiments of the invention.

FIG. 11 is a side perspective view of a piece of fabric with an embedded lighting device in accordance with aspects of embodiments of the invention.

DETAILED DESCRIPTION OF THE INVENTION

Figure 4B:
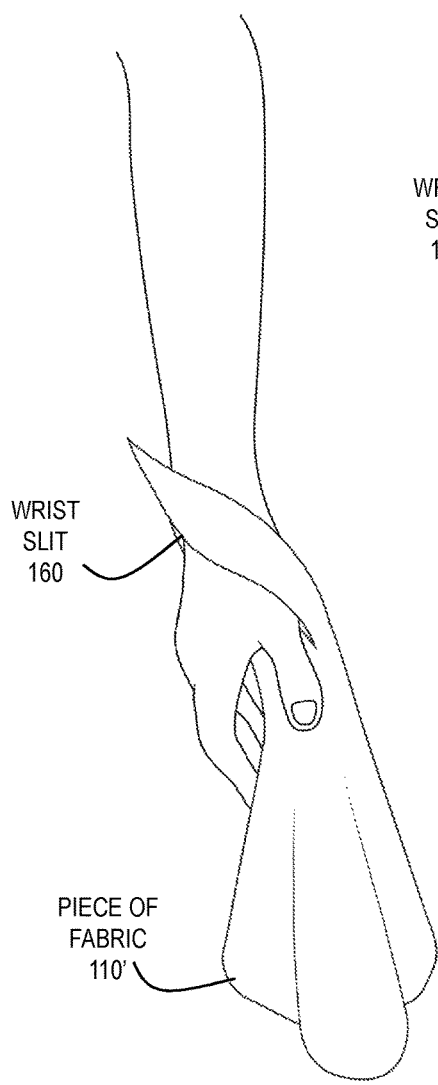
FIG. 4B is a perspective view of the piece of fabric of FIG. 4A secured around a wrist of a user in accordance with aspects of embodiments of the invention.

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

FIGS. 1-3 are top cut-away views of an apparatus 100 including a piece of fabric 110 and LEDs 120 in accordance with aspects of embodiments of the invention. In one embodiment, the piece of fabric 110 is a towel with a length 140 of approximately 18 inches or within a range of 15-20 inches and a width 142 of approximately 15 inches or within a range of 12-18 inches. In another embodiment, the piece of fabric 110 is a towel with a length 140 of approximately 24 inches or within a range of 22-26 inches and a width 142 of approximately 18 inches or within a range of 15-20 inches. In another embodiment, the piece of fabric 110 is a bandana with a length 140 of approximately 22 inches or within a range of 20-24 inches and a width 142 of approximately 22 inches or within a range of 20-24 inches. The above numerical dimensions and ranges are merely exemplary and the piece of fabric 110 is not limited to any specific numerical dimension or range. Although FIGS. 1-3 depict that the piece of fabric 110 is rectangular, the piece of fabric 110 is not limited to this shape and may be square, circular, oval, triangle or any polygon shape appreciated by one skilled in the art.

In some embodiments, the piece of fabric 110 is made from any textile, cloth or flexible woven material including but not limited to cotton and/or polyester. In some embodiments, textile includes any flexible material consisting of a network of natural or artificial fibers (e.g. yarn or thread). Yarn is produced by spinning raw fibers of wool, flax, cotton or other material to produce long strands. In some embodiments, textile material used to form the piece of fabric 110 is formed by weaving, knitting, crocheting, knotting or felting. In an embodiment, the piece of fabric 110 is made from any fabric material, including fabrics that are woven, non-woven as well as knitted fabrics and netted fabrics and technical fabrics (such as Gore-Tex® and Gannex®). In one embodiment, the piece of fabric 110 is made from natural fabrics or synthetic fabrics. In some embodiments, the piece of fabric 110 is not limited to natural material (e.g. cloth) and includes synthetic materials such as translucent plastic material. In some embodiments, the piece of fabric 110 is translucent and one or more characteristics of the piece of fabric 110 is selected so that the fabric 110 is translucent. These characteristics include but are not limited to color, weave spacing and thickness. In another embodiment, the piece of fabric 110 is made from silicone material and/or polyurethane material.

As illustrated in FIGS. 1-3, a slot 112 is formed along four sides 114, 116, 117, 119 of the piece of fabric 110. In one embodiment, the slot 112 is formed by folding the four sides 114, 116, 117, 119 inwardly and applying stitching 115 that runs approximately parallel to the four sides 114, 116, 117, 119. A width 144 of the slot 112, defined between the stitching 115 and the edge of the respective sides 114, 116, 117, 119 is approximately 1 inch or within a range of 0.5-2 inches. Although FIGS. 1-3 depict the slot 112 formed continuously along the four sides 114, 116, 117, 119, the slot 112 need not be formed along the four sides 114, 116, 117, 119 and may be formed along less than the four sides 114, 116, 117, 119. In other embodiments, the slot 112 does not extend over one of the sides 114, 116, 117, 119 and instead extends over an interior area of the fabric 110. In an example embodiment, the slot 112 extends from a first corner of the fabric 110 (e.g. junction of the first side 114 and second side 116) to an opposite corner of the fabric 110 (e.g. junction of the third side 117 and fourth side 119). In other embodiments, the slot 112 is not formed with stitching 115 and instead can be formed with an adhesive or Velcro® after folding the fabric 110 along the one or more sides 114, 116, 117, 119.

As further illustrated in FIGS. 1-3, LEDs 120 are positioned within the slot 112 over the first side 114 and the second side 116. The LEDs 120 are electrically connected by a cable 121 that extends between the LEDs 120 within the slot 112. In one embodiment, the cable 121 has a continuous length within the slot 112 of approximately 36 inches or within a range of 30-40 inches. In another embodiment, the LEDs 120 are spaced apart by a fixed separation along the cable 121. In an example embodiment, the LEDs 120 are spaced by approximately 3.5 inches or within a range of 2-5 inches, for example. The above numerical dimensions and ranges are merely exemplary and the length of the cable 121 as well as the spacing of the LEDs 120 is not limited to any specific dimension or numerical range. In some embodiments, the length of the cable 121 is based on the collective length of the slot 112 through which the cable 121 is extended. In an example embodiment, if the cable 121 is extended through the slot 112 over the first side 114 and second side 116, the length of the cable 121 is based on the collective length of the slot 112 over the first side 114 and second side 116. Although LEDs are depicted in FIG. 1, the apparatus 100 is not limited to LEDs and encompasses any lighting device that can be positioned within the slot 112 over the one or more sides of the fabric 110.

As shown in FIG. 1, since the LEDs 120 are not positioned within the slot 112 over the third side 117 and fourth side 119, this advantageously permits the third side 117 and/or the fourth side 119 to be used for other purposes, such as holding the piece of fabric 110, for example. Although FIGS. 1-3 depict the LEDs 120 positioned in the slot 112 over the first side 114 and the second side 116, the LEDs 120 need not be positioned within the slot 112 over the first and second sides 114, 116 and instead may be positioned in the slot 112 over any one of the sides 114, 116, 117, 119 and/or in the slot 112 over a portion of one of the sides 114, 116, 117, 119. In an embodiment, the LEDs 120 are a linear array of LEDs and/or LED strip lights. In an example embodiment, the LEDs 120 comprise SS1 RGB Soft Strip system provided by Edge Lighting, 1718 W. Fullerton Avenue, Chicago Ill. 60614. In another embodiments, the LEDs 120 are wireless LEDs that are positioned within the slot 112 and are not electrically connected by the cable 121. In some embodiments, the wireless LEDs would be sewn inside the slot 112 or placed inside of a custom slot and then sewn or attached to the custom slot.

As further illustrated in FIGS. 1-3, a button 118 is operatively coupled to the LEDs 120 by the cable 121 such that the LEDs 120 illuminate upon depression of the button 118. In one embodiment, the LEDs 120 illuminate in a static mode (i.e. LEDs 120 stay on) upon a first depression of the button 118 and the LEDs 120 illuminate in a flashing mode (i.e. LEDs 120 flash on and off) upon a second depression of the button 118. In another embodiment, the LEDs 120 illuminate in the flashing mode upon the first depression of the button 118 and the LEDs 120 illuminate in the static mode upon the second depression of the button 118. In yet another embodiment, the LEDs 120 illuminate in a first flashing mode (i.e. LEDs flash at a first rate) upon the first depression of the button 118 and the LEDs 120 illuminate in a second flashing mode (i.e. LEDs flash at a second rate different than the first rate) upon the second depression of the button 118. In an example embodiment, the second rate is greater than the first rate. In another example embodiment, the second rate is lower than the first rate. In these embodiments, depression of the button 118 cycles the LEDs 120 through one or more static and/or flashing modes, after which a depression of the button 118 deactivates the LEDs 120. Subsequent depression of the button 118 recycles the LEDs 120 through the one or more static and/or flashing modes.

In another embodiment, the LEDs 120 illuminate in a first color upon a first depression of the button 118 and the LEDs 120 illuminate in a second color different than the first color upon a second depression of the button 118. In this embodiment, depression of the button 118 cycles the LEDs 120 through a plurality of different colors, after which a depression of the button 118 deactivates the LEDs 120. Subsequent depression of the button 118 recycles the LEDs 120 through the plurality of different colors.

In another embodiment, upon depression the button 118, each LED 120 is illuminated at a first color during a first time period and a second color other than the first color during a second time period after the first time period. In an example embodiment, upon depression of the button 118, a first LED 120 is illuminated at a first color and a second LED 120 is illuminated at a second color different than the first color during a first time period and the first LED 120 is illuminated at the second color and the second LED 120 is illuminated at the first color during a second time period after the first time period. In an example embodiment, the time period is approximately 1 second or within a range of 0.5-2 seconds. However, the LEDs 120 need not have different colors during each respective time period.

Although FIGS. 1-3 depict the piece of fabric 110 where the LEDs 120 are positioned within the slot 112 along the first and second sides 114, 116 of the piece of fabric 110, in other embodiments the LEDs 120 extend within the slot 112 along three continuous sides 114, 116, 117 of the fabric 110. In one embodiment, the LEDs 120 extend within the slot 112 over the sides 114, 116 and a portion of the third side 117. In another embodiment, the LEDs 120 extend within the slot 112 over the sides 114, 116 and the entire third side 117. In these embodiments, since the LEDs 120 are not positioned within the slot 112 over the fourth side 119, this advantageously permits the fourth side 119 to be used for other purposes, such as holding the piece of fabric 110, for example.

Figure 4A:
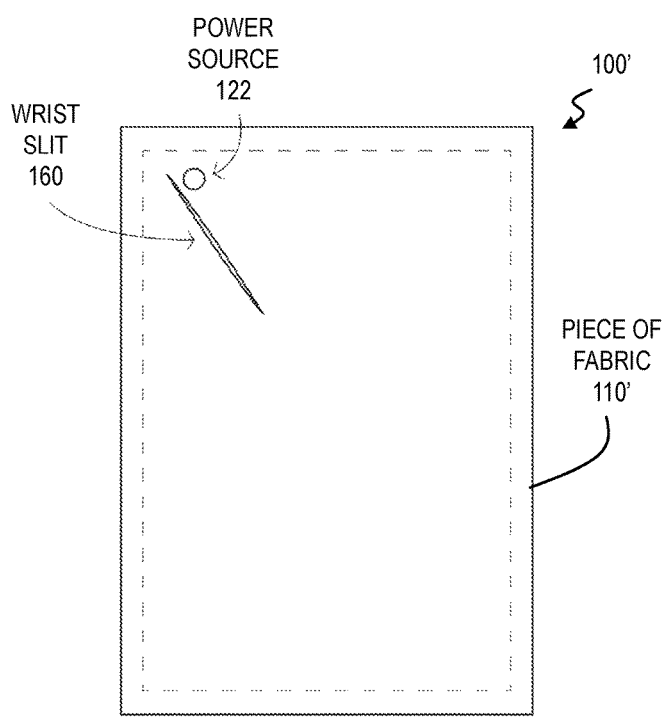
FIG. 4A is a top cut-away view of an apparatus including a piece of fabric with a wrist slit in accordance with aspects of embodiments of the invention.

FIG. 4A is a top cut-away view of an apparatus 100' including a piece of fabric 110' with a wrist slit 160 and LEDs in accordance with aspects of embodiments of the invention. The piece of fabric 110' is similar to the piece of fabric 110 discussed above, with the exception of the features discussed herein. The wrist slit 160 is formed in the piece of fabric 110'. In one embodiment, the wrist slit 160 is formed adjacent a corner of the piece of fabric 110'. In an example embodiment, the wrist slit 160 is formed adjacent the corner of the piece of fabric 110' defined by a junction of the third side 117 and fourth side 119. In an example embodiment, the wrist slit 160 is oriented from a first corner (e.g. junction of sides 117, 119) to an opposite corner (e.g. junction of sides 114, 116) of the piece of fabric 110'. In an example embodiment, the wrist slit 160 has a length within a range of 4-6 inches such as 5 inches. FIG. 4B is a perspective view of the piece of fabric 110' of FIG. 4A secured around a wrist of a user in accordance with aspects of embodiments of the invention. To secure the piece of fabric 110' around the wrist, the user passes his or her hand through the slit 160 such that the piece of fabric 110' encircles the wrist of the user. This advantageously secures the piece of fabric 110' to the wrist of the user, such as when the user swings the piece of fabric 110'.

In other embodiments, a wrist strap is attached to the piece of fabric (e.g. at a corner of the piece of fabric) and the wrist of the user is secured to the piece of fabric using the wrist strap. Any wrist strap appreciated by one of ordinary skill in the art could be used. FIG. 4C is a top cut-away view of an apparatus including the piece of fabric 110 with an elastic strap 162 and LEDs in accordance with aspects of embodiments of the invention. The elastic band 162 is attached to the piece of fabric 110 adjacent to a corner of the piece of fabric 110. In some embodiments, opposite ends of the elastic band 162 are sewn or woven into the piece of fabric 110. In other embodiments, the elastic band 162 is attached to the piece of fabric 110 using any adhesive appreciated by one skilled in the art. In still other embodiments, the elastic band 162 is attached to the piece of fabric 110 by passing the elastic band 162 through an opening in the piece of fabric 162 and forming a knot in the elastic band 162. FIG. 4D is a perspective view of the piece of fabric 110 of FIG. 4C secured around a wrist of a user with the elastic band 162 in accordance with aspects of embodiments of the invention.

Figure 5:
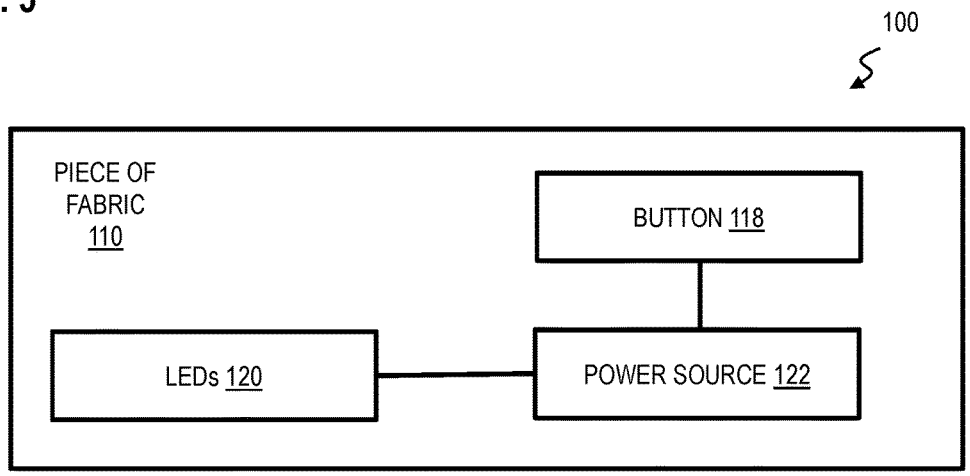
FIG. 5 is a schematic diagram of the apparatus of FIG. 1.

FIG. 5 is a schematic diagram of the apparatus 100 of FIG. 1. The apparatus 100 includes a power source 122 connected to the button 118 to receive a signal upon depression of the button 118. The power source 122 is connected to the LEDs 120 to transmit a signal to the LEDs 120 to illuminate the LEDs 120 upon receiving the signal from the button 118. In an example embodiment, where the LEDs 120 are wireless, the button 118 wirelessly transmits a signal to a respective power source integral with each LED to illuminate each LED. In an example embodiment, the power source 122 is one or more 3 Volt Lithium batteries, such as CR2032 or CR2016 or LR44. In another example embodiment, the power source 122 is a silicone battery pack. In the previously-discussed embodiment, the power source 122 transmits a static signal to the LEDs 120 to illuminate the LEDs 120 in the static mode upon a first depression of the button 118 and the power source 122 transmits an alternating signal (AC or DC) to the LEDs 120 to illuminate the LEDs 120 in the flashing mode upon the second depression of the button 118. In another previously-discussed embodiment, the power source 122 transmits a first signal to the LEDs 120 to illuminate the LEDs 120 in the first color upon the first depression of the button 118 and transmits a second signal to the LEDs 120 to illuminate the LEDs 120 in the second color upon the second depression of the button 118. In another previously-discussed embodiment, upon depression of the button 118, during the first time period the power source 122 transmits a signal to the first LED 120 to illuminate the first LED 120 at the first color and transmits a signal to the second LED 120 to illuminate the second LED 120 at the second color. Subsequently, during the second time period, the power source 122 transmits a signal to the first LED 120 to illuminate the first LED 120 at the second color and transmits a signal to the second LED 120 to illuminate the second LED 120 at the first color.

Figure 6:
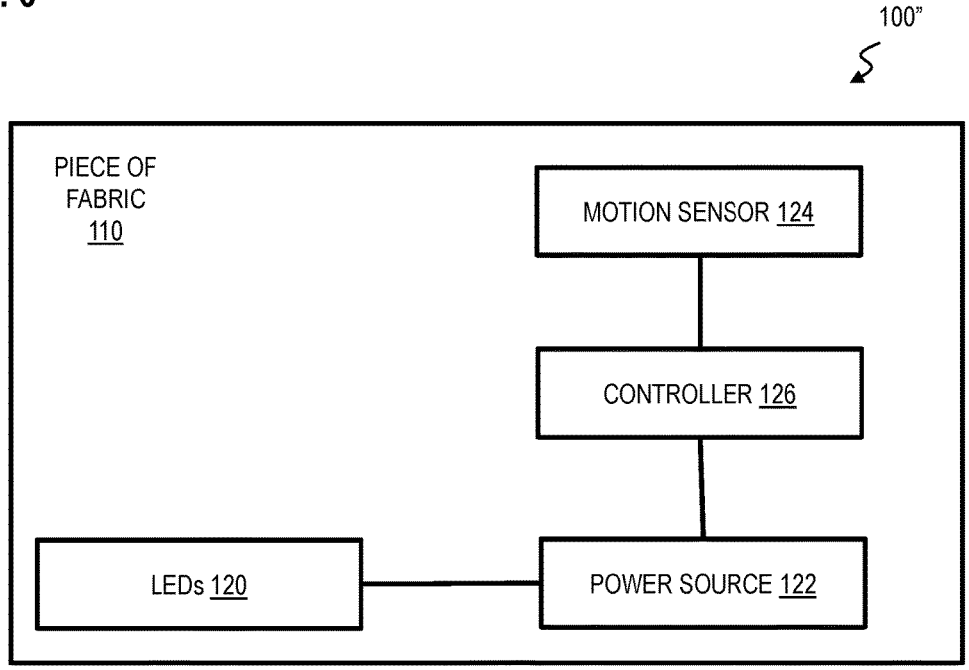
FIG. 6 is a schematic diagram of an apparatus including a piece of fabric and LEDs in accordance with aspects of embodiments of the invention.

FIG. 6 is a schematic diagram of an apparatus 100" including the piece of fabric 110 and LEDs 120 in accordance with aspects of embodiments of the invention. As with the piece of fabric 110 of FIGS. 1-3, the LEDs 120 are positioned within the slot 112 of the piece of fabric 110. The apparatus 100" also includes a motion sensor 124 to measure a motion parameter of the piece of fabric 110. As depicted in FIG. 6, a controller 126 is connected to the motion sensor 124, such that the controller 126 receives the measured motion parameter from the motion sensor 124, and compares the measured motion parameter with a motion threshold stored in a memory of the controller 126. If the measured motion parameter exceeds the motion threshold, the controller 126 sends a signal to the power source 122, such that the power source 122 in turn transmits a signal to the LEDs 120 to illuminate the LEDs 120.

In one embodiment, the motion sensor 124 is an accelerometer that measures a magnitude of an acceleration of the piece of fabric 110. In an example embodiment, the motion sensor 124 is an accelerometer that measures a magnitude of a centrifugal acceleration of the piece of fabric 110, when the piece of fabric 110 is moved in a circular or approximately circular path of travel. As previously discussed, the controller 126 compares the measured acceleration with an acceleration threshold. In one embodiment, the acceleration threshold can be calculated, based on one or more parameters of the piece of fabric 110, as discussed below.

Figure 7:
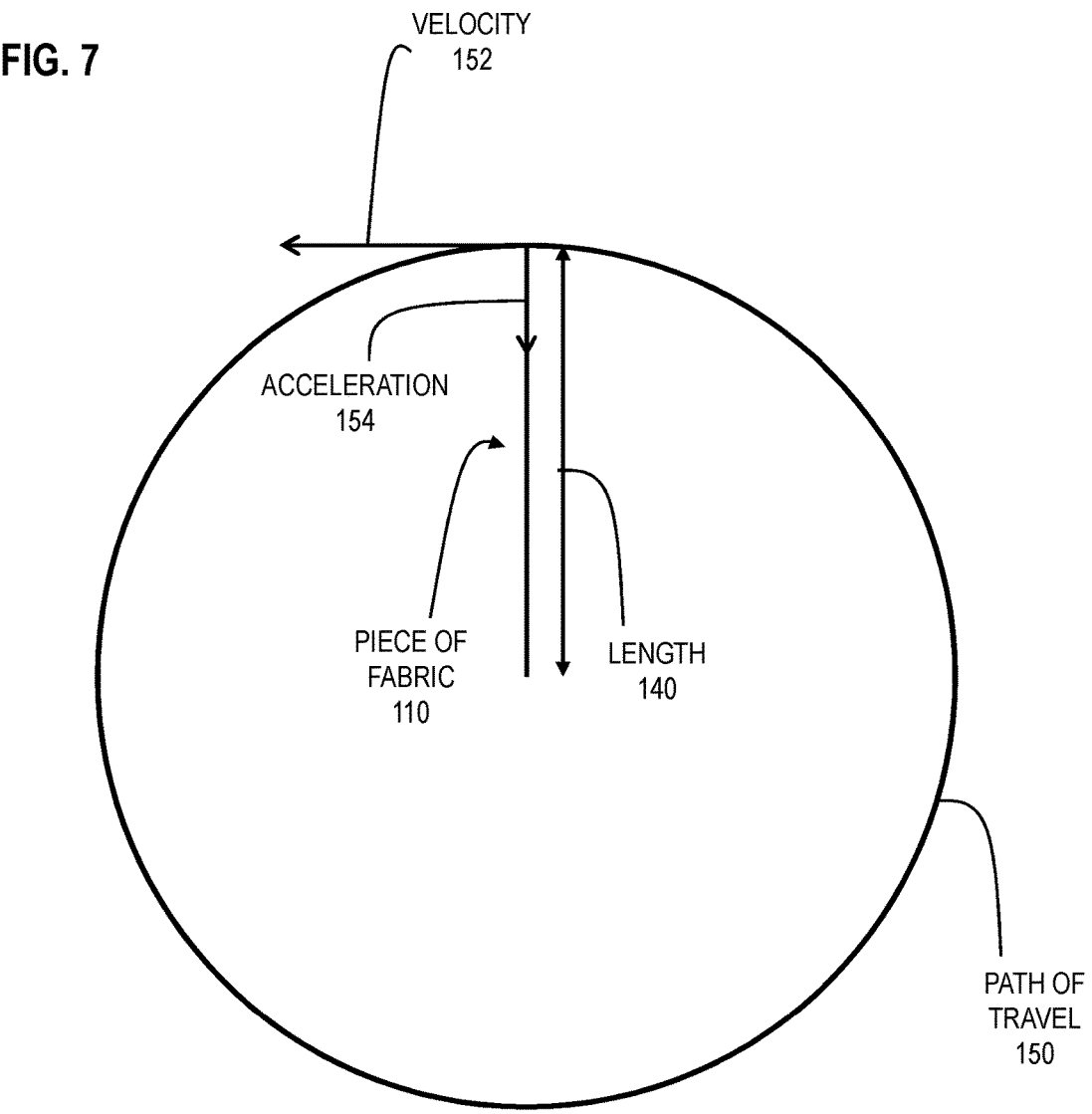
FIG. 7 is a schematic diagram of a path of travel of the apparatus of FIG. 6.

FIG. 7 is a schematic diagram of a path of travel 150 of the piece of fabric 110 of FIG. 6. In one embodiment, the path of travel 150 is circular or approximately circular such that a velocity 152 of the piece of fabric 110 is oriented tangent to the path of travel 150 and a centrifugal acceleration 154 is oriented orthogonal to the path of travel 150. As appreciated by one skilled in the art, the magnitude of the centrifugal acceleration 154 is given by:

$$a = \frac{v^2}{l} \qquad (1)$$

where a is the magnitude of the centrifugal acceleration 154, v is the magnitude of the velocity 152 and l is the length 140 of the piece of fabric 110. In an example embodiment, the length 140 is 18 inches. The magnitude of the velocity 152 can be determined by:

$$v = \omega * 2\pi * l \qquad (2)$$

where v is the magnitude of the velocity 152, ω is the number of revolutions per second of the piece of fabric 110 and l is the length 140. In one embodiment, where the length 140 is 18 inches, and the piece of fabric 110 revolves at 1 revolution per second, equation (2) provides that the magnitude of the velocity 152 is approximately 113 inches/second and equation (1) provides that the magnitude of the acceleration 154 is approximately 710 inches/second$^2$ or 18 meters/second$^2$. In this embodiment, the motion threshold stored in the controller 126 is set to approximately 18 meters/second$^2$. However, the motion threshold can be adjusted to any acceleration threshold, which is generated using equations (1) and (2) with one or more parameters of the piece of fabric 110, including the length 140 and the number of revolutions per second of the piece of fabric 110.

In this example embodiment, equations (1)-(2) are used to initially calculate the acceleration threshold which is then stored in the memory of the controller 126. During operation, the motion sensor 124 measures the magnitude of the acceleration 154 of the piece of fabric 110 as it travels along the path of travel 150. The motion sensor 124 then transmits the measured acceleration to the controller 126, which compares the measured acceleration with the acceleration threshold. If the measured acceleration received by the controller 126 exceeds the acceleration threshold, the controller 126 transmits a signal to the power source 122, such that the power source 122 subsequently transmits a signal to illuminate the LEDs 120. At a later time, if the measured acceleration received by the controller 126 no longer exceeds the acceleration threshold, the controller 126 transmits a signal to the power source 122, to turn off the LEDs 120.

In one embodiment, the LEDs 120 illuminate in the static mode upon the motion parameter exceeding a first motion threshold and the LEDs 120 illuminate in the flashing mode upon the motion parameter exceeding a second motion threshold greater than the first motion threshold. In an example embodiment, the LEDs 120 illuminate in the static mode upon the measured acceleration exceeding a first acceleration threshold and the LEDs 120 illuminate in the flashing mode upon the measured acceleration exceeding a second acceleration threshold greater than the first acceleration threshold. For example the first acceleration threshold may be based on a first number of revolutions of the piece of fabric (e.g. one revolution per second) and generated using equations (1)-(2) whereas the second acceleration threshold may be based on a second number of revolutions of the piece of fabric (e.g. two revolutions per second) and generated using equations (1)-(2).

In one embodiment, the LEDs 120 illuminate in the first color upon the motion parameter exceeding a first motion threshold and the LEDs 120 illuminate in the second color different than the first color upon the motion parameter exceeding a second motion threshold greater than the first motion threshold. In an example embodiment, the LEDs 120 illuminate in the first color upon the measured acceleration exceeding a first acceleration threshold and the LEDs 120 illuminate in the second color upon the measured acceleration exceeding a second acceleration threshold greater than the first acceleration threshold. For example the first acceleration threshold may be based on a first number of revolutions of the piece of fabric (e.g. one revolution per second) and generated using equations (1)-(2) whereas the second acceleration threshold may be based on a second number of revolutions of the piece of fabric (e.g. two revolutions per second) and generated using equations (1)-(2).

Figure 8:
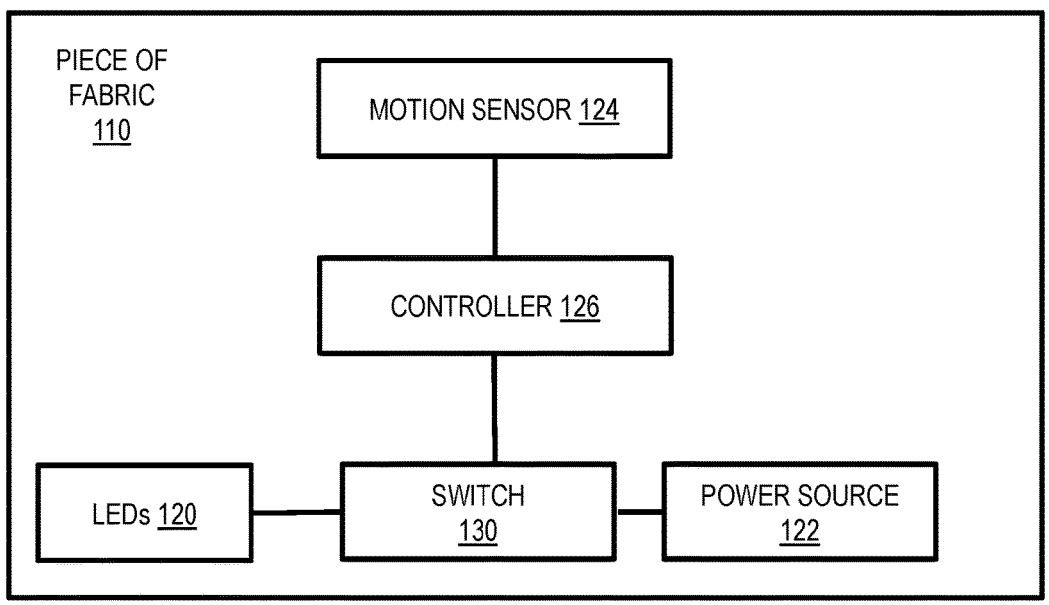
FIG. 8 is a schematic diagram of an apparatus including a piece of fabric and LEDs in accordance with aspects of embodiments of the invention.

FIG. 8 is a schematic diagram of an apparatus 100''' including the piece of fabric 110 and LEDs 120 in accordance with aspects of embodiments of the invention. As with the piece of fabric 110 of FIGS. 1-3, the LEDs 120 are positioned within the slot 112 of the piece of fabric 110. The apparatus 100''' also includes a switch 130 with a first side connected to the LEDs 120 and a second side connected to the power source 122. The switch 130 has an off position which electrically disconnects the LEDs 120 from the power source 122 and an on position that electrically connects the LEDs 120 to the power source 122 such that the power source 122 transmits a signal to the LEDs 120 to illuminate the LEDs 120. The apparatus 100''' includes a motion sensor 124 and controller 126 similar to the motion sensor 124 and controller 126 of FIG. 6. The controller 126 receives the motion parameter from the motion sensor 124 and compares the motion parameter with the motion threshold stored in a memory of the controller 126, as with the controller 126 of FIG. 6. Upon determining that the motion parameter exceeds the motion threshold, the controller 126 transmits a signal to the switch 130 to turn the switch 130 to the on position, such that the power source 122 is electrically connected to the LEDs 120 to illuminate the LEDs 120. In some embodiments, upon determining that the motion parameter no longer exceeds the motion threshold, the controller 126 transmits a signal to the switch 130 to turn the switch 130 to the off position, so that the power source 122 is electrically disconnected from the LEDs 120 to turn off the LEDs 120.

Figure 10A:
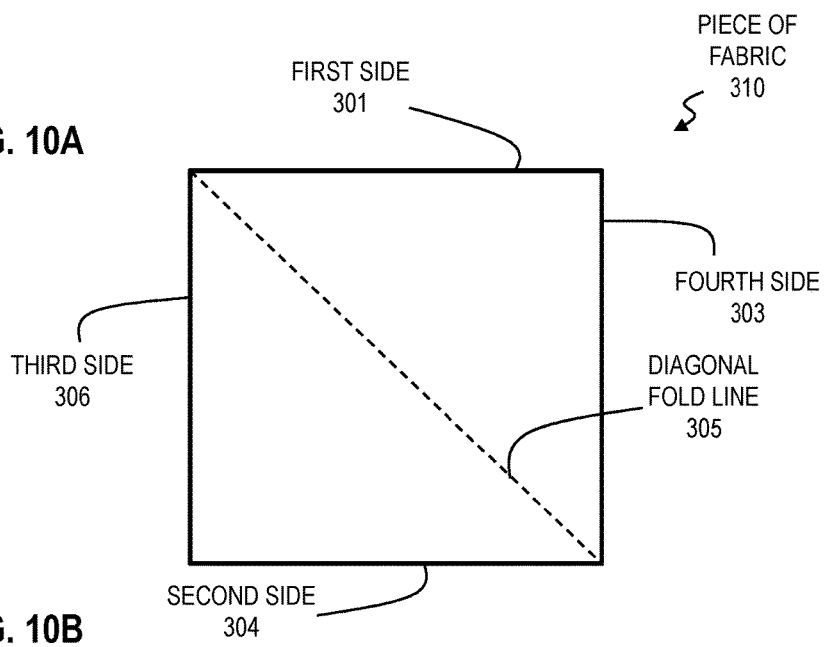
FIG. 10A is a top view of an initial piece of fabric used to form a piece of fabric with an embedded lighting device in accordance with aspects of embodiments of the invention.

FIG. 10A is a top view of an initial piece of fabric 310 used to form a piece of fabric 300 with an embedded lighting device in accordance with aspects of embodiments of the invention. In an embodiment, the initial piece of fabric 310 is a rectangular or square shaped piece of fabric with four sides 301, 304, 303, 306. In an embodiment, the initial piece of fabric 310 is made from any of the materials that are used to make the piece of fabric 110. In an example embodiment, the piece of fabric 310 is a square shaped piece of fabric where each side 301, 303, 304, 306 has a length in a range from about 13 inches to about 27 inches. In yet another example embodiment, each side 301, 303, 304, 306 has a length of about 13 inches or about 22 inches or about 27 inches, for example.

In an embodiment, a fold 302 is formed in the piece of fabric 310 along a fold line 305. In some embodiments, the fold line 305 is a diagonal fold line 305 between opposing corners of a square shaped piece of fabric 310. In an embodiment, the piece of fabric 310 is folded along the diagonal fold line 305 so that an edge of the first side 301 is flush with an edge of the second side 304 and an edge of the third side 306 is flush with an edge of the fourth side 303. In other embodiments, the fold 302 is along another region of the piece of fabric 310 other than a diagonal fold line 305 between two opposing corners.

Figure 10B:
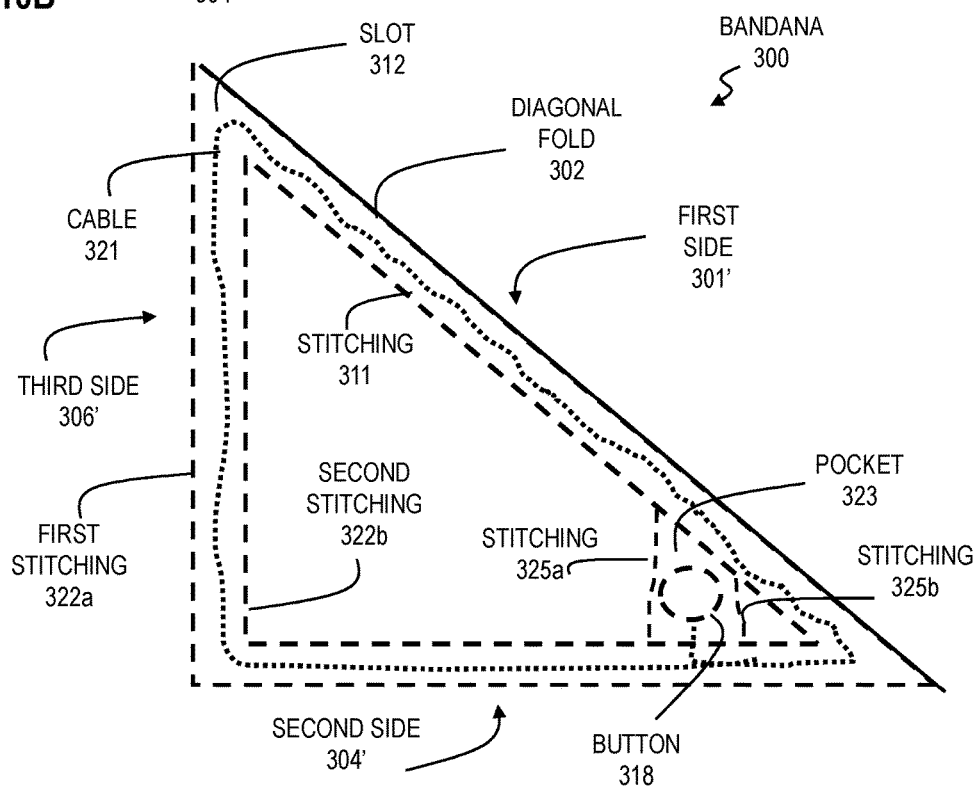
FIG. 10B is a top view of a piece of fabric with an embedded lighting device that is formed with the initial piece of fabric of FIG. 10A in accordance with aspects of embodiments of the invention.

FIG. 10B is a top view of a piece of fabric 300 with an embedded lighting device 120 that is formed with the initial piece of fabric 310 of FIG. 10A in accordance with aspects of embodiments of the invention. In an embodiment the piece of fabric 300 has a triangular shape that includes a first side 301', a second side 304' and a third side 306'. In an example embodiment, the piece of fabric 300 only includes the three sides 301', 304', 306'. In an embodiment, the first side 301' is formed by the diagonal fold 302 in the piece of fabric 310. In an embodiment, the second side 304' is formed by the first side 301 being flush with the second side 304 of the piece of fabric 310 and the third side 306' is formed by the third side 306 being flush with the fourth side 303 of the piece of fabric 310 when the piece of fabric 310 is folded along the fold line 305. In an example embodiment, the piece of fabric 300 is a bandana. In an example embodiment, the first side 301' has a length in a range from about 18 inches to about 40 inches or a length of about 18 inches or a length of about 31 inches or a length of about 38 inches. In example embodiment, the second side 304' and third side 306' each have a length in a range from about 13 inches to about 27 inches or a length of about 13 inches or a length of about 22 inches or a length of about 27 inches. In an embodiment, one or more logos (e.g. Litewave®) can be placed at one or more locations of the piece of fabric 300.

In an embodiment, stitching 311 is applied along an interior of the first side 301' so that a slot 312 is formed along the first side 301' between the stitching 311 and the diagonal fold 302. In an example embodiment, the stitching 311 is about parallel to the diagonal fold 302 or the edge of the first side 301'. In an example embodiment, the slot 302 has a width in a range from about 0.5 inches to about 2 inches.

In another embodiment, first stitching 322a is applied along an edge of the second side 304' and an edge of the third side 306'. In an example embodiment, the first stitching 322a along the second side 304' is used to stitch the edge of the first side 301 to the edge of the second side 304. In another example embodiment, the first stitching 322a along the third side 306' is used to stitch the edge of the third side 306 to the edge of the fourth side 303.

In yet another embodiment, second stitching 322b is applied along an interior of the second side 304' and the third side 306' so that the slot 312 is formed along the second side 304' and the third side 306' between the first stitching 322a and second stitching 322b. In an example embodiment, the first stitching 322a is about parallel with the second stitching 322b along the second side 304' and the third side 306'. Although FIG. 10B depicts that the slot 312 extends along each of the three sides 301', 304', 306' of the piece of fabric 300, in other embodiments, the slot 312 extends along only one or two of the sides 301', 304', 306'. In an example embodiment, the slot 312 extends along the first side 301' but does not extend along the second and third sides 304', 306'. In yet another example embodiment, the slot 312 extends along the second and third sides 304', 306' but does not extend along the first side 301'. In yet another example embodiment, the slot 312 extends along one of the second and third sides 304', 306', but does not extend along the remaining sides of the piece of fabric 300.

In an embodiment, a cable 321 is positioned within the slot 312 that is similar to the cable 121 and the cable 321 includes lighting devices such as LEDs 120 (not depicted in FIG. 10B) in a similar arrangement as the cable 121. In another embodiment, a power source (not depicted in FIG. 10B) is provided that is similar to the power source 122 of the apparatus 100. In yet another embodiment, a button 318 is provided that is similar to the button 118 and is operatively coupled to the LEDs 120 and the power source 122 so that the LEDs 120 on the cable 321 illuminate upon depression of the button 318. In one embodiment, the LEDs 120 of the cable 321, the power source 122 and the button 318 and are configured to operate in a similar manner as the LEDs 120 of the cable 121, the power source 122 and the button 118 of the apparatus 100.

In an embodiment, a pocket 323 is formed in the piece of fabric 300 and the button 318 is held in the pocket 323 and thus the pocket 323 is sized to hold the button 318. In another embodiment, the power source 122 is electrically coupled to the button 118 and the cable 321 and the power source 122 is also held in the pocket 323 and thus the pocket 323 is sized to hold the button 318 and the power source 122. As depicted in FIG. 10B, in one embodiment the pocket 323 is formed in an interior of the piece of fabric 300 between the slot 312 formed along the first side 301' and the slot 312 formed along the second side 304' that is adjacent to the first side 301'. In another embodiment, the pocket 323 is formed in the piece of fabric 300 adjacent a junction of the first side 301' and second side 304' between a pair of stitching 325a, 325b, where the stitching 325a, 325b is non-parallel with the first side 301' and the second side 304'.

Figure 10C:
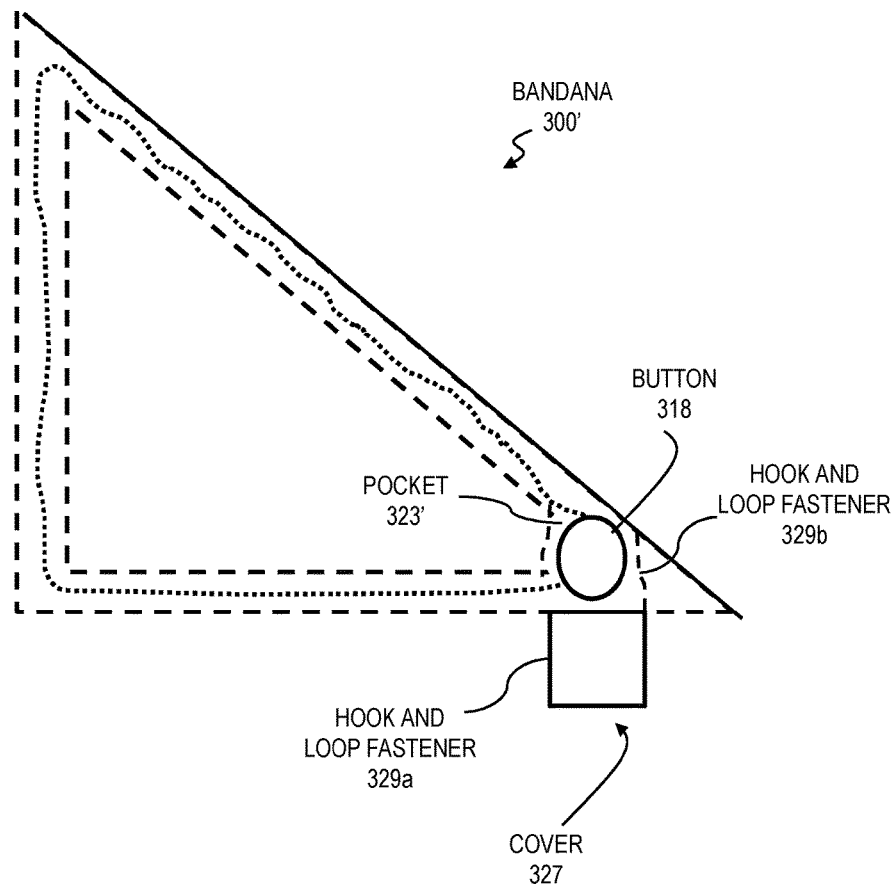
FIG. 10C is a top view of a piece of fabric with an embedded lighting device with an open cover to expose a button positioned within a pocket in accordance with aspects of embodiments of the invention.

FIG. 10C is a top view of a piece of fabric 300' with an embedded lighting device with an open cover 327 to expose the button 318 positioned within a pocket 323' in accordance with aspects of embodiments of the invention. The piece of fabric 300' is similar to the piece of fabric 300 with the exception of the features discussed herein. In an embodiment, the pocket 323' to hold the button 318 is positioned in the slot 312, unlike the pocket 323 of the piece of fabric 300 that is positioned outside of the slot 312. Additionally, in an embodiment, a detachable cover 327 is provided for the pocket 323'. In one embodiment, the cover 327 includes hook and loop fasteners 329a (e.g. Velcro®) that detachably secure the cover 327 to hook and loop fasteners 329b (e.g. Velcro®) adjacent to the pocket 323'. In some embodiments, the cover 327 is completely detached from the piece of fabric 300 after the fasteners 329a, 329b are detached. In other embodiments, the cover 327 is detached from the pocket 323' when the fasteners 329a, 329b are detached a portion of the cover 327 remains attached to the piece of fabric 300 (e.g. stitching that forms a rotating hinge). In an example embodiment, the hook and loop fasteners 329a are provided around part of or an entire perimeter of the cover 327 and the hook and loop fasteners 329b are provided around part of or an entire perimeter of the pocket 323'. In an example embodiment, the hook and loop fasteners 329b are provided along the stitching 325a, 325b on opposing sides of the pocket 323'. When the button 318 and/or the power source 122 needs to be replaced or serviced, the cover 327 is advantageously opened by detaching the fasteners 329a, 329b so to provide access to the button 318 and/or power source 122 for easy removal and/or replacement of the button 318 and power source 122.

FIG. 11 is a side perspective view of a piece of fabric 400 with an embedded lighting device in accordance with aspects of embodiments of the invention. In an embodiment, the piece of fabric 400 is a cylindrical piece of fabric such as a compression sleeve that is made of elastic material. In other embodiments, the piece of fabric 400 is a sweat band such as a wrist sweat band.

In one embodiment, where the piece of fabric 400 is a compression sleeve, the piece of fabric 400 has a first end 402 with a first diameter and a second end 404 with a second diameter that is larger than the first diameter. To wear the compression sleeve, the user places their hand into the opening in the second end 404 and passes their hand through the opening in the first end 402 so that the first end 402 encompasses a portion of a lower arm of the user and the second end 404 encompasses a portion of an upper arm of the user.

In another embodiment, where the piece of fabric 400 is a sweat band (e.g. wrist sweat band), the first end 402 has a diameter that is about equal to a diameter of the second end 404.

In an embodiment, a slot 412a is formed along a circumference of the piece of fabric 400 at the second end 404. Although FIG. 11 depicts that the slot 412a is formed along the circumference of the second end 404, in other embodiments, the slot 412a is formed along a portion of the circumference of the second end 404. In an embodiment, a cable 421 is positioned within the slot 412a that includes one or more lighting devices such as LEDs 120 (not shown) in a similar arrangement as the cable 121. In another embodiment, a slot 412b is also formed along an interior of the piece of fabric 400 between the first end 402 and the second end 404. In some embodiments, the piece of fabric 400 includes the slot 412a but excludes the slot 412b or includes the slot 412b but excludes the slot 412a. As with the slot 412a, the cable 421 extends with in the slot 412b and includes lighting devices such as LEDs 120 along the cable 421 within the slot 412b. In an embodiment, the slots 412a, 412b are formed using similar techniques as the slots of the other embodiments discussed herein (e.g. stitching, overlapping or folding the fabric 400 and applying stitching).

In an embodiment, a button 418 is provided in the piece of fabric 400 and is operatively coupled to the LEDs 120 along the cable 421 in a manner similar to the button 118 being operatively coupled to the LEDs 120 along the cable 121. In one embodiment, the button 418 is positioned adjacent the first end 402 of the piece of fabric 400.

In another embodiment, a power source (not shown) is provided that is similar to the power source 122 of the apparatus 100 and is used in conjunction with the button 418 to illuminate LEDs 120 along the cable 421 in a similar manner as the power source 122 is used in conjunction with the button 118 to illuminate the LEDs 120 along the cable 121.

In yet another embodiment, the piece of fabric 400 includes a motion sensor 124 and controller 126 (not shown) that operate in a similar manner with the LEDs 120 and power source 122 as the motion sensor 124 and the controller 126 of the apparatus 100" of FIG. 6.

Figure 9A:
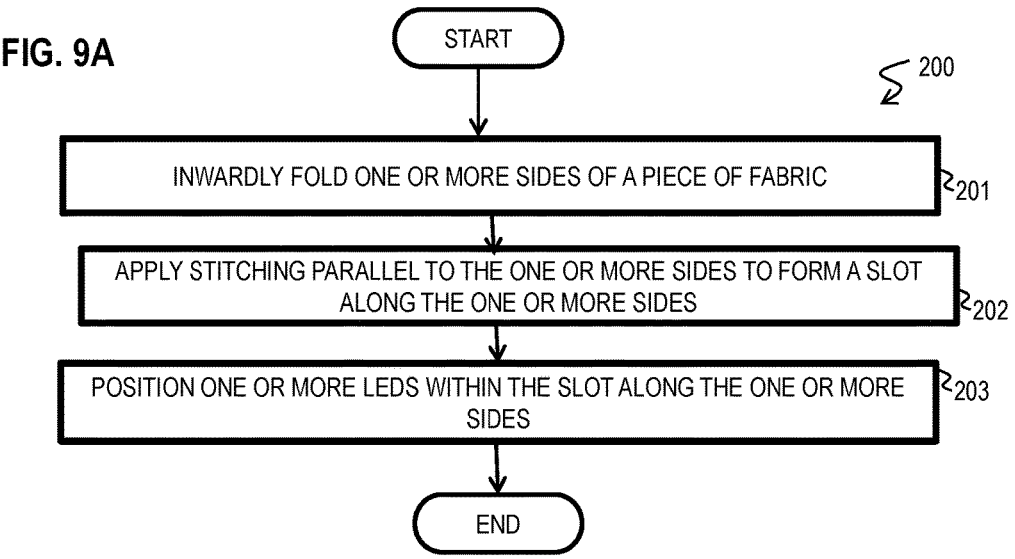
FIG. 9A is a flow chart depicting a method for assembling the apparatus of FIG. 1 in accordance with aspects of embodiments of the invention.
Figure 9B:
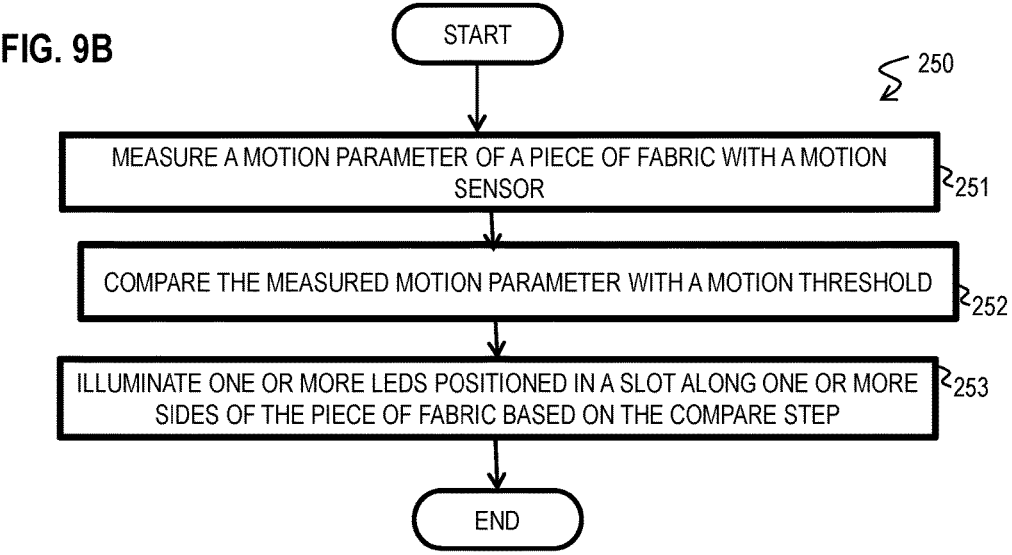
FIG. 9B is a flow chart depicting a method for using the apparatus of FIG. 6 in accordance with aspects of embodiments of the invention.
Figure 9C:
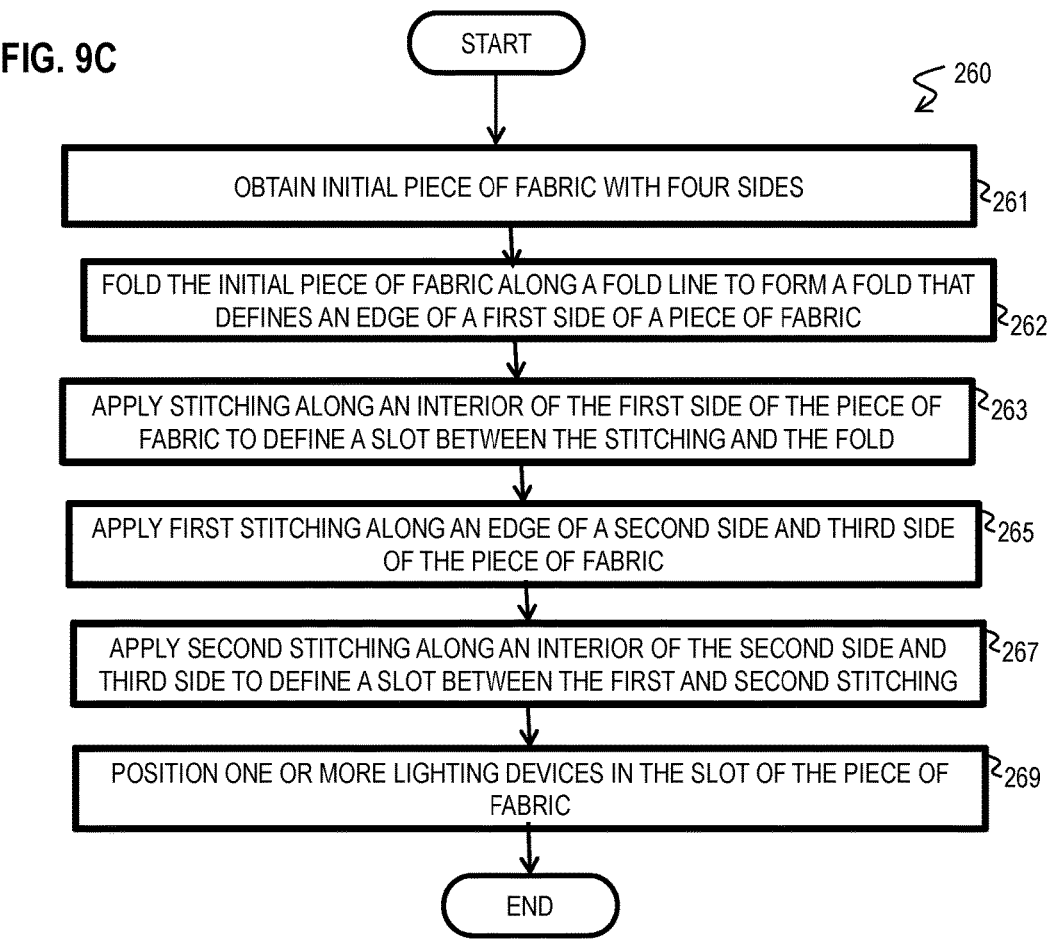
FIG. 9C is a flow chart depicting a method for forming a piece of fabric with an embedded lighting device in accordance with aspects of embodiments of the invention.

Although steps are depicted in FIGS. 9A-9C, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

FIG. 9A is a flow chart depicting a method 200 for assembling the apparatus 100 of FIG. 1 in accordance with aspects of embodiments of the invention. In step 201, one or more sides 114, 116, 117, 119 of the piece of fabric 110 are folded inward. In an example embodiment, the one or more sides 114, 116, 117, 119 are folded inward by a distance in a range of 0.5-2 inches. In some embodiments, all four sides 114, 116, 117, 119 of the piece of fabric 110 are folded inward. In other embodiments, less than all four sides 114, 116, 117, 119 of the piece of fabric 110 are folded inward.

In step 202, stitching 115 is applied along the one or more inwardly folded sides 114, 116, 117, 119 of step 201. In one embodiment, the stitching 115 is applied in a direction that is approximately parallel to each of the inwardly folded sides 114, 116, 117, 119. However, the stitching 115 need not be applied in an approximate parallel direction to each of the inwardly folded sides 114, 116, 117, 119. Upon applying the stitching 115, the slot 112 is formed along the inwardly folded sides 114, 116, 117, 119.

In step 203, one or more LEDs 120 are positioned in the slot 112 formed in step 202. In some embodiments, the LEDs 120 are electrically connected by the cable 121 and are operatively coupled to the button 118. In other embodiments, the LEDs 120 are electrically connected by the cable 121 and are operatively coupled to the motion sensor 124 and controller 126 (FIG. 6). In still other embodiments, the LEDs 120 are wirelessly connected to the button 118 and each include an integral power source that receive a wireless signal from the button 118 to illuminate each respective LED 120.

FIG. 9B is a flow chart depicting a method 250 for using the apparatus 100" of FIG. 6 in accordance with aspects of embodiments of the invention. In step 251, a motion parameter (e.g. acceleration) of the piece of fabric 110 is measured with the motion sensor 124. In some embodiments, the motion parameter is measured at motion sensor 124 increment time intervals appreciated by one skilled in the art. In some embodiments, the motion parameter is centrifugal acceleration.

In step 252, the measured motion parameter from step 251 is compared with a motion threshold stored in the memory of the controller 126. In some embodiments, the motion threshold is a centrifugal acceleration threshold and computed using Equations 1-2. In other embodiments, the motion threshold is an angular velocity threshold. In still other embodiments, the motion threshold is a linear velocity threshold or linear acceleration threshold. In some embodiments, in step 251 the controller 126 determines whether the measured motion parameter from step 251 is greater than the motion threshold.

In step 253, the one or more LEDs 120 positioned in the slot 112 of the piece of fabric 110 are illuminated, based on the comparison in step 252. In some embodiments, the one or more LEDs 120 are illuminated if the measured motion parameter is greater than the motion threshold. In one embodiment, the one or more LEDs 120 are subsequently turned off if the measured motion parameter is less than the motion threshold.

FIG. 9C is a flow chart depicting a method 260 for forming a piece of fabric 300 with an embedded lighting device 120 in accordance with aspects of embodiments of the invention. In step 261, an initial piece of fabric 310 is obtained with four sides 301, 303, 304, 306. In some embodiments, the initial piece of fabric has less or more than four sides. In an example embodiment, the initial piece of fabric 310 is a rectangular or a square sized piece of fabric.

In step 262, the initial piece of fabric 310 is folded along a fold line 305 to form a fold 302 that defines an edge of a first side 301' of the piece of fabric 300. In one embodiment, the fold line 305 is a diagonal fold line 305 between opposing corners of a rectangular or square sized initial piece of fabric 310 and the fold 302 is a diagonal fold 302 along the diagonal fold line 305. In another embodiment, the fold line 305 is a diagonal fold line 305 between opposing corners of a square sized initial piece of fabric 310 and the fold 302 is a diagonal fold 302 between the opposing corners of the square sized initial piece of fabric 310.

In step 263, stitching 311 is applied along an interior of the first side 301' of the piece of material 300 to define a slot 312 between the stitching 311 and the fold 302 formed in step 262. In one embodiment, the stitching 311 is applied along the interior in a direction that is about parallel (e.g. within ±10 degrees) to the edge of the side 301' or the fold 302. In some embodiments, the stitching 311 is applied along the interior of the entire first side 301'. In other embodiments, the stitching 311 is applied along the interior of a portion of the first side 301'.

In step 265, first stitching 322a is applied along an edge of a second side 304' of the piece of material 300 and first stitching 322a is applied along an edge of a third side 306' of the piece of material 300. In an embodiment, the edge of the second side 304' of the piece of material 300 is formed in step 262 when the initial piece of fabric 310 is folded along the fold line 305 and the first side 301 is aligned flush with the second side 304 of the initial piece of material 310. In another embodiment, the edge of the third side 306' is formed in step 262 when the initial piece of material 310 is folded along the fold line 305 and the fourth side 303 is aligned flush with the third side 306 of the initial piece of material 310. In an embodiment, in step 265, the first stitching 322a is applied as close as possible to the edges of the second side 304' and third side 306'. In some embodiments, in step 265 the first stitching 322a is only applied along an edge of one of the second side 304' or the third side 306'.

In step 267, second stitching 322b is applied along an interior of the second side 304' of the piece of material 300 and along an interior of the third side 306' to further define the slot 312 between the first stitching 322a applied in step 265 and the second stitching 322b applied in step 267. In an embodiment, in step 267 the second stitching 322b is applied so that the second stitching 322b is about parallel with the first stitching 322a. In another embodiment, the second stitching 322b is applied so that the width of the slot 312 between the first and second stitching 322a, 322b is in a range from about 0.5 inches to about 2 inches. In some embodiments, the first and second stitching 322a, 322b is only applied over one of the second side 304' or the third side 306'.

In step 269, one or more lighting devices are positioned in the slot 312 of the piece of fabric 300. In one embodiment, the cable 321 with the LEDs 120 is positioned in the slot 312. In another embodiment, in step 269 the button 318 and the power source 122 is positioned in the piece of fabric 300 and operatively coupled to the cable 321 and LEDs 120. In one embodiment, the button 318 and power source 122 are positioned in the pocket 323, 323'.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An apparatus comprising:
    a piece of fabric comprising three sides, wherein the piece of fabric is folded along a first side of the three sides such that the first side comprises a fold along an edge of the first side;
    a slot formed along at least one of the three sides;
    at least one lighting device positioned within the slot; and
    a button operatively coupled to the at least one lighting device such that the at least one lighting device is configured to illuminate upon depression of the button.

2. The apparatus of claim 1, wherein the slot is formed along the three sides.

3. The apparatus of claim 1, wherein the piece of fabric only comprises the three sides.

4. The apparatus of claim 1, wherein the at least one lighting device is at least one LED.

5. The apparatus of claim 1, further comprising stitching applied along the first side such that the slot is formed along the first side between the stitching and the fold.

6. The apparatus of claim 1, further comprising first stitching applied along an edge of a second side and a third side of the three sides and second stitching applied along an interior of the second side and the third side such that the slot is formed along the second side and the third side between the first stitching and the second stitching.

7. The apparatus of claim 1, further comprising a pocket formed in the piece of fabric to hold the button.

8. The apparatus of claim 7, wherein the pocket is formed between a first stitching and a second stitching in the piece of fabric.

9. The apparatus of claim 8, wherein the pocket is formed in an interior of the piece of fabric between the slot formed along a first side of the three sides and the slot formed along a second side of the three sides, wherein the first side is adjacent to the second side.

10. The apparatus of claim 8, wherein the pocket is formed adjacent a junction of a first side and a second side of the three sides, wherein the first side is adjacent the second side and wherein the first stitching and the second stitching are oriented non-parallel with each of the first side and the second side.

11. The apparatus of claim 7, further comprising a detachable cover for the pocket, wherein the cover includes hook and loop fasteners that are configured to attach to hook and loop fasteners adjacent the pocket.

12. An apparatus comprising:
    a cylindrical shaped piece of fabric including a first end with a first diameter and a second end with a second diameter that is larger than the first diameter, wherein the second end is opposite to the first end;
    a slot formed in the cylindrical piece of fabric along a circumference of the second end;
    at least one lighting device positioned within the slot; and
    a button operatively coupled to the at least one lighting device such that the at least one lighting device is configured to illuminate upon depression of the button.

13. The apparatus of claim 12,
    wherein the piece of fabric is made of an elastic material and wherein the button is positioned adjacent to the first end; and
    wherein the slot is further formed in the piece of fabric along an interior of the cylindrical shaped piece of fabric material between the first end and the second end.

14. A method for forming a piece of fabric with an embedded lighting device comprising:
    providing a piece of fabric comprising three sides including obtaining an initial piece of fabric comprising four sides and folding the initial piece of fabric along a diagonal fold line to form a fold that defines an edge of a first side of the three sides of the piece of fabric;
    forming a slot along at least one of the three sides; and
    positioning at least one lighting device within the slot.

15. The method of claim 14, wherein the forming the slot comprises applying stitching along an interior of the first side of the piece of fabric to define a slot between the stitching and the fold along the first side of the piece of fabric.

16. The method of claim 14, wherein the forming the slot comprises:
- applying first stitching along an edge of a second side and a third side of the piece of fabric; and
- applying second stitching along an interior of the second side and the third side such that the slot is defined between the first stitching and second stitching along the second side and the third side.

* * * * *